United States Patent [19]
Shimoji

[11] Patent Number: 5,838,713
[45] Date of Patent: Nov. 17, 1998

[54] CONTINUOUSLY TUNABLE BLUE MICROCHIP LASER

[76] Inventor: Yutaka Shimoji, 2125 University Ct., Clearwater, Fla. 34624

[21] Appl. No.: 848,349
[22] Filed: Apr. 21, 1997
[51] Int. Cl.⁶ .................................................. H01S 3/08
[52] U.S. Cl. .............................. 372/92; 372/22; 372/98; 372/34; 372/101
[58] Field of Search .................. 372/22, 92, 34, 372/101, 98, 95

[56] References Cited

U.S. PATENT DOCUMENTS

| | | | |
|---|---|---|---|
| 4,477,909 | 10/1984 | Salvi et al. ................................. | 372/98 |
| 5,410,563 | 4/1995 | Nakamura et al. ....................... | 372/101 |
| 5,430,754 | 7/1995 | Suzuki et al. .............................. | 372/92 |
| 5,651,022 | 7/1997 | Anthon et al. ............................ | 372/92 |
| 5,680,412 | 10/1997 | DeMaria et al. ......................... | 372/92 |
| 5,732,100 | 3/1998 | Thony et al. .............................. | 372/98 |

*Primary Examiner*—Leon Scott, Jr.

[57] ABSTRACT

Second Harmonic microchip laser producing coherent blue wavelengths tunable from 430 nm to 480 nm is disclosed. The microchip laser is formed by an optical contact of two crystal surfaces with a small gap, which provides a stable laser performance. The same technology is also applied to generate other blue, UV, and infrared lasers.

20 Claims, 7 Drawing Sheets

CONTINUOUSLY TUNABLE BLUE MICROCHIP LASER

BACKGROUND OF THE INVENTION

The present invention relates to active monolithic crystalline doped media for blue laser luminescence which are tunable continuously over a broad band of wavelengths. Known monolithic laser cavities produce only a single wavelength or a very restricted band of frequencies and they have low frequency doubling efficiency of less than 10% and they generate noise levels greater than a standard deviation of 10%.

Dixon et al. in an article entitled: "Efficient blue emission from an intracavity-doubled 946 nm Nd:YAG laser" appearing in Optics Letters, Vol.13, pg. 137–139 (1988) discloses coherent emission at 473 nm from an intercavity-doubled Nd:YAG microlaser. However, the output power was only 5 mW, and the frequency doubling efficiency was only 2%.

It has been shown that $KNbO_3$ is an effective electro-optic frequency doubling crystal to produce blue coherent light in a U.S. Pat. No. 4,809,291 to Byer et al. A thermoelectric heat exchanger is also disclosed which is coupled to the laser crystals to phase match to the pumping laser radiation. But, the laser crystal, Nd:YAG, is shown to be separate from the doubler crystal, and it is taught that both power and amplitude stability are increased by this decoupling. This teaches away from the monolithic microchip microlaser of the present invention.

A diode pumped 473 nm Nd:YAG/$KNbO_3$ microchip laser is disclosed by Matthews et al. in an article entitled "Diode pumping of a blue (473 nm) Nd:YAG/$KNbO_3$ microchip laser" in CLEO'96 Vol.9, pgs 174–175 (1996) as a monolithic micro chip. However, the maximum blue output power was only 26.5 mW with blue intensity noise of plus or minus 7% to 20%.

A bonded microchip laser whose temperature is controlled by a Peltier cooler in thermal contact with the microchip is disclosed by Tatsuno et al. in U.S. Pat. No. 5,377,212. However, there is a separate mirror, so the entire structure is not monolithic, and the crystalline composition is entirely different from the present invention. Furthermore, the device is not tunable.

None of the above disclosures include tunability of the output wavelength.

It is taught by Convoy et al. in an article entitled "Gain guiding and thermal distortion in diode pumped Nd:$YVO_4$ microchip lasers", in CLEO'96, Vol.9, pgs 175–176 (1996) that heating and deformation of the single Nd:$YVO_4$ crystal result in a tuning rate of 1.4 GHz per degree centigrade change in crystal temperature. Aspherical focusing and collimating lenses are disclosed. However, the heat was applied by the pumping laser and there is no frequency doubling crystal and there is no thermoelectric device external to the crystal. Further, the tuning band was only 600 GHz for the 1064 nm line.

It is known to change the wavelength of a laser beam by wavefront conversion with the use of lenses, mirrors and crystals with conical surfaces as disclosed by Tanuma in U.S. Pat. Nos. 5,355,246 and 5,173,799, however, this is not applied to any tunable lasers.

A continuously tunable UV Ce:LiSAF laser is disclosed in U.S. Pat. No. 5,487,079 to Esterowitz et al. However, tuning is achieved by a motor attached to a birefringent tuning plate, grating or prism which is placed between the laser crystal and the output mirror. The efficiency was only 14% and the device has many moving components and is complicated and costly to build.

A tunable $Sc^{2+}$ based UV to visible spectral range laser is disclosed in U.S. Pat. No. 5,471,493 to Mirov et al. However, the base crystal must be changed in composition in order to change the output wavelength and there is a motor unit which rotates a diffraction grating.

A composite cavity microchip laser having four spaced, parallel, dielectrically coated surfaces on the gain medium and doubling medium crystal surfaces, and small annular shaped dielectric spacers between the lasing medium and the doubling crystal preferably 50–500 microns wide are disclosed in U.S. Pat. No. 5,574,740 to Hargis et al. However, the present invention includes only two dielectric coatings instead of four. Furthermore, the present invention does not require any spacer, dielectric, nor epoxy in the interface between the two crystal media. Therefore the prior art involves the extra fabrication steps of creating these dielectric spacers with bonding agents which is not required in the present invention.

The goal of the present invention is to satisfy the need to develop a practical, simple, powerful, highly efficient, continuously tunable microchip laser which has low noise and which can be produced at low cost.

SUMMARY OF THE INVENTION

The object of the present invention is to provide a single monolithic cavity laser out of at least two different laser crystals for the purpose of generating coherent blue light efficiently and with low noise. It is a further object to provide continuous tunability over a broad wavelength range without any moving parts or complex components, and without the requirement to alter the crystal composition.

These and other objects are achieved according to the present invention by a monolithic cavity made of at least two different solid state crystals bonded to each other with a small gap in such a way as to obtain maximum power stability. The input crystal is pumped by a semiconductor pumping laser and there is an aspherical lens system positioned between the pumping laser and the microchip laser media to focus and collimate the pumping laser beam designed to maximize the power of the output laser beam.

Tunability over a wide band from 430 nm to 480 nm is achieved by a thermoelectric heat exchanger affixed in thermal contact with the laser microchip which continuously tunes the index of refraction by heating or cooling the crystal laser media.

DESCRIPTION OF PREFERRED EMBODIMENTS

Figure 1:
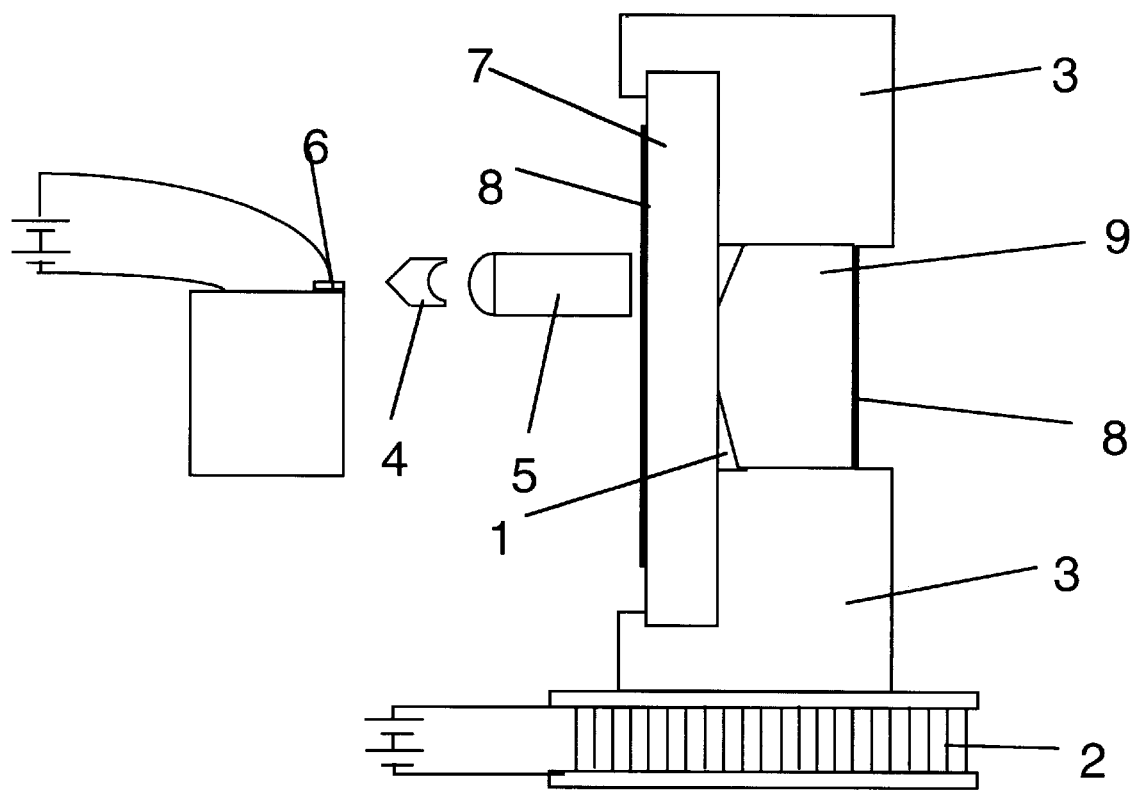
FIG. 1 is a Cr:LISAF/$KNbO_3$ monolithic microchip continuously tunable laser.

The main feature of the present invention which contributes to the achievement of the objects of the invention is the crystal bonding of different laser media with the inclusion of a small wedge shaped gap 1, which is at least 0.5 micron to at most 3 microns in thickness, to obtain a single axial mode which gives rise to improved power stability. There is no requirement for any dielectric, air, nor any bonding agent in the wedge shaped gap 1. This increases power generation and improves frequency doubling efficiency to 20%. The noise level is reduced to at most a standard deviation of 0.1%. These results are surprising and completely unexpected in view of the prior art. Another feature common to all of the embodiments and FIGS. 1–7 is a thermo-electric heating and cooling heat exchanger 2 affixed to the microchip holder 3 to fine tune the output wavelength by changing and controlling the index of refraction of the laser media in a continuous way. Another common feature in all the embodiments and FIGS. 1–7 is an aspherical microlens 4 and a gradient index lens 5 which are positioned between a semiconductor pumping laser 6 and the first crystal 7 of the lasing media. The external surfaces both closest and furthest away from the pumping laser are both coated with a dielectric thin film coating 8.

In the first embodiment, shown in FIG. 1, the laser media are two crystals. The first crystal 7 is Cr:LiSAF and the second crystal 9 is $KNbO_3$. Upon pumping by the semiconductor laser 6 the first crystal 7 lases at a wavelength of at least 860 nm and at most 960 nm, and the second crystal 9 frequency doubles at a continuously tunable output wavelength of at least 430 nm and at most 480 nm. The power of the pumping laser 6 is at least 30 m Watt and the output power of the second crystal is at least 10 micro Watts.

Figure 2:
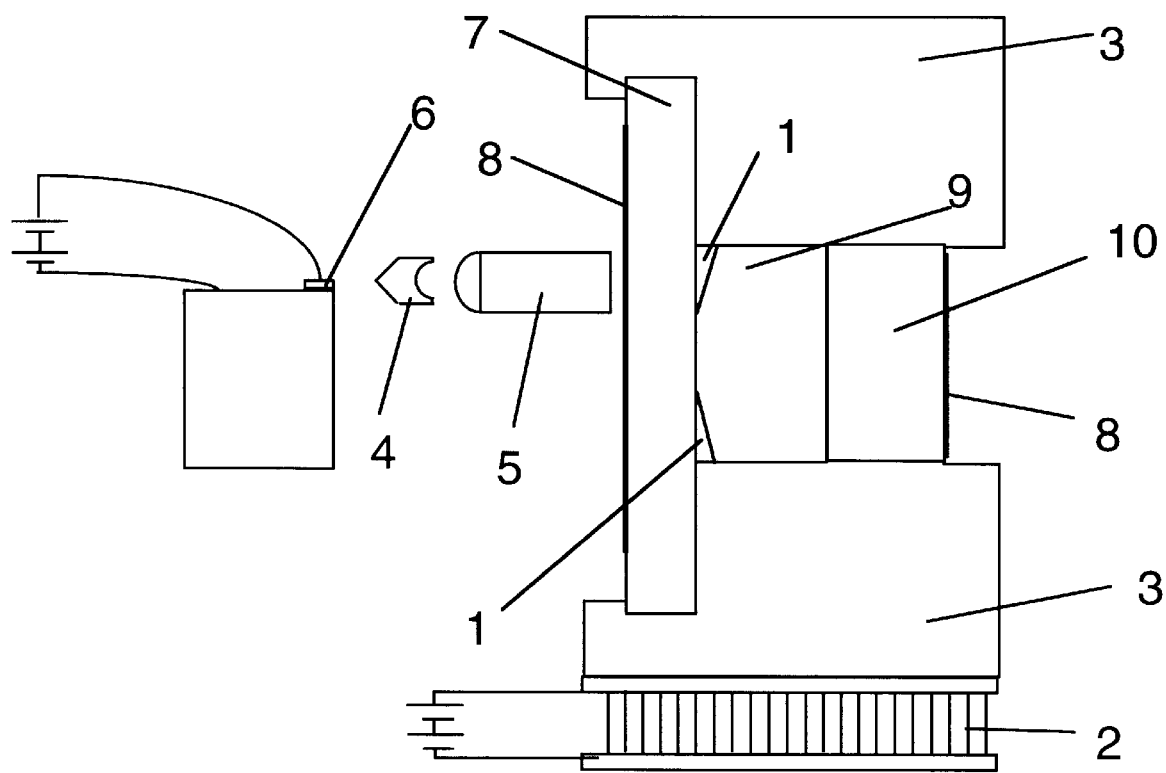
FIG. 2 is a Nd:YAG/$KNbO_3$/LBO monolithic microchip UV laser.

In the second embodiment, shown in FIG. 2, there are three crystals which make up the laser media. The first crystal 7 is Nd:YAG, the second crystal 9 is $KNbO_3$, and the third crystal 10 is LBO. The output wavelength emitted by the third crystal 10 is controlled to at least 354 nm and at most 356 nm. The power of the pumping laser 6 is at least 1 Watt and the output power of the third crystal 10 is at least 10 m Watts. Both the second crystal 9 and the third crystal 10 are frequency doubling laser media.

Figure 3:
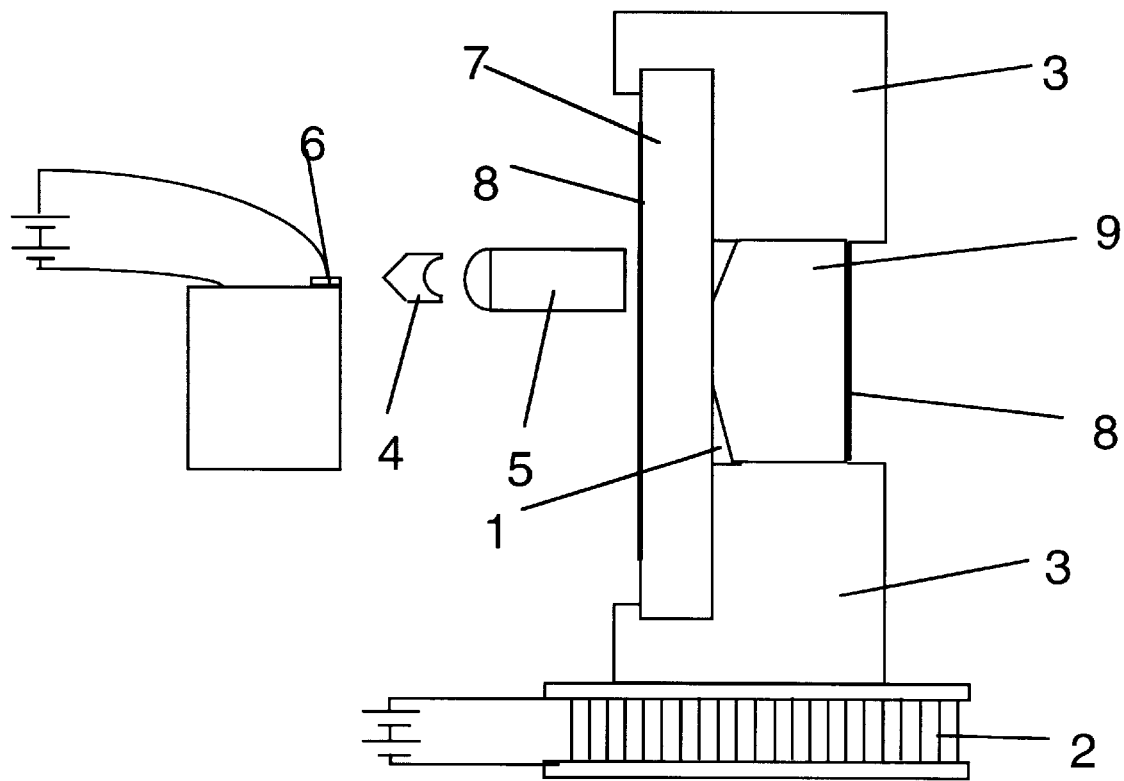
FIG. 3 is a Nd:$YVO_4$/$KNbO_3$ monolithic microchip blue laser.

In the third embodiment, shown in FIG. 3, there are two crystals which make up the laser media. The first crystal 7 is $Nd:YVO_4$ and the second crystal 9 is $KNbO_3$. Upon pumping by the semiconductor laser 6 the first crystal 7 lases at a wavelength of at least 912 nm and at most 918 nm, the second crystal 9 frequency doubles at a controlled output wavelength of at least 456 nm and at most 459 nm. The power of the pumping laser 6 is at least 1 Watt, and the output power of the second crystal is at least 50 m Watts.

Figure 4:
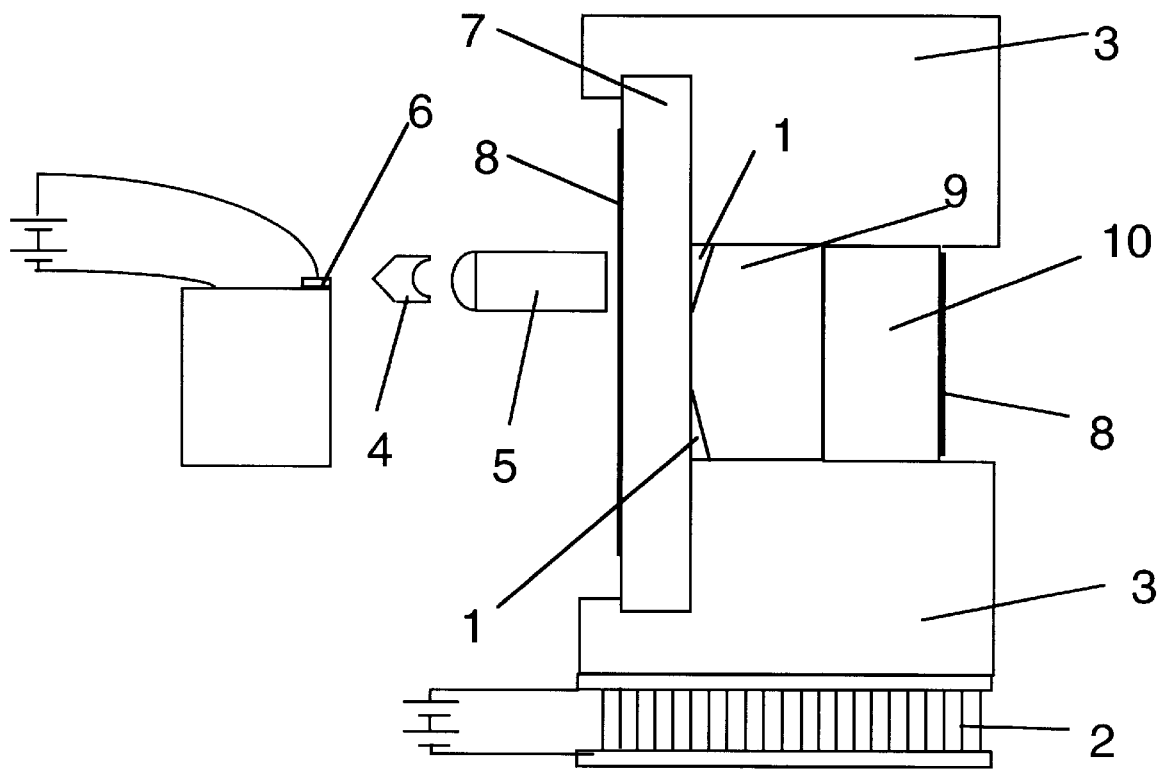
FIG. 4 is a Nd:YAG/KTP/$KNbO_3$ monolithic microchip tunable optical parametric oscillator.

In the fourth embodiment, shown in FIG. 4, a continuously tuning optical parametric oscillator is shown. There are three crystals which make up the laser media. The first crystal 7 is Nd:YAG, the second crystal 9 is KTP, and the third crystal is $KNbO_3$. Upon pumping by the semiconductor laser 6 the third crystal 10 emits a continuously tunable range of wavelengths of at least 2000 nm and at most 4500 nm. Both the second crystal 9 and the third crystal 10 are frequency doubling laser media.

Figure 5:
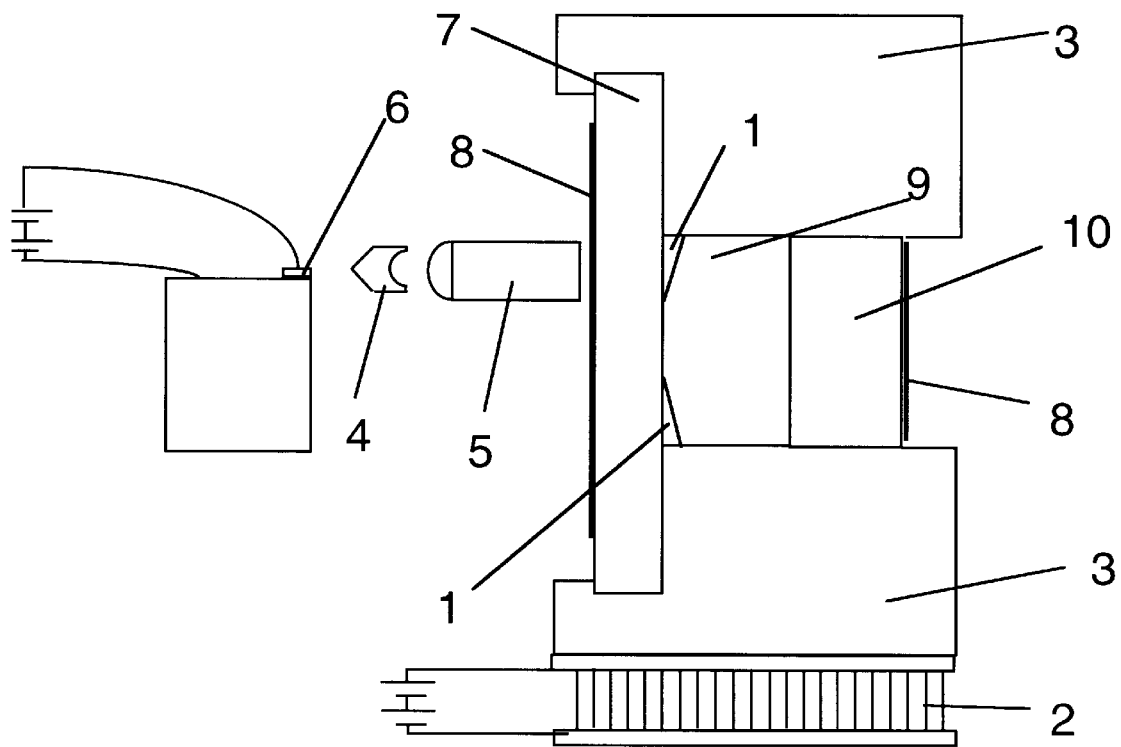
FIG. 5 is a Nd:YAG/Cr:$Mg_2SiO_4$/$KNbO_3$ monolithic microchip continuously tunable laser.

In the fifth embodiment, shown in FIG. 5, there are three crystals which make up the laser media. The first crystal 7 is Nd:YAG, the second crystal 9 is $Cr:Mg_2SiO_4$, and the third crystal 10 is $KNbO_3$. Upon pumping by the semiconductor laser 6 the third crystal 10 emits a continuously tunable output range of wavelengths of at least 565 nm and at most 684 nm. Both the first crystal 7 and the second crystal 9 are laser gain media.

Figure 6:
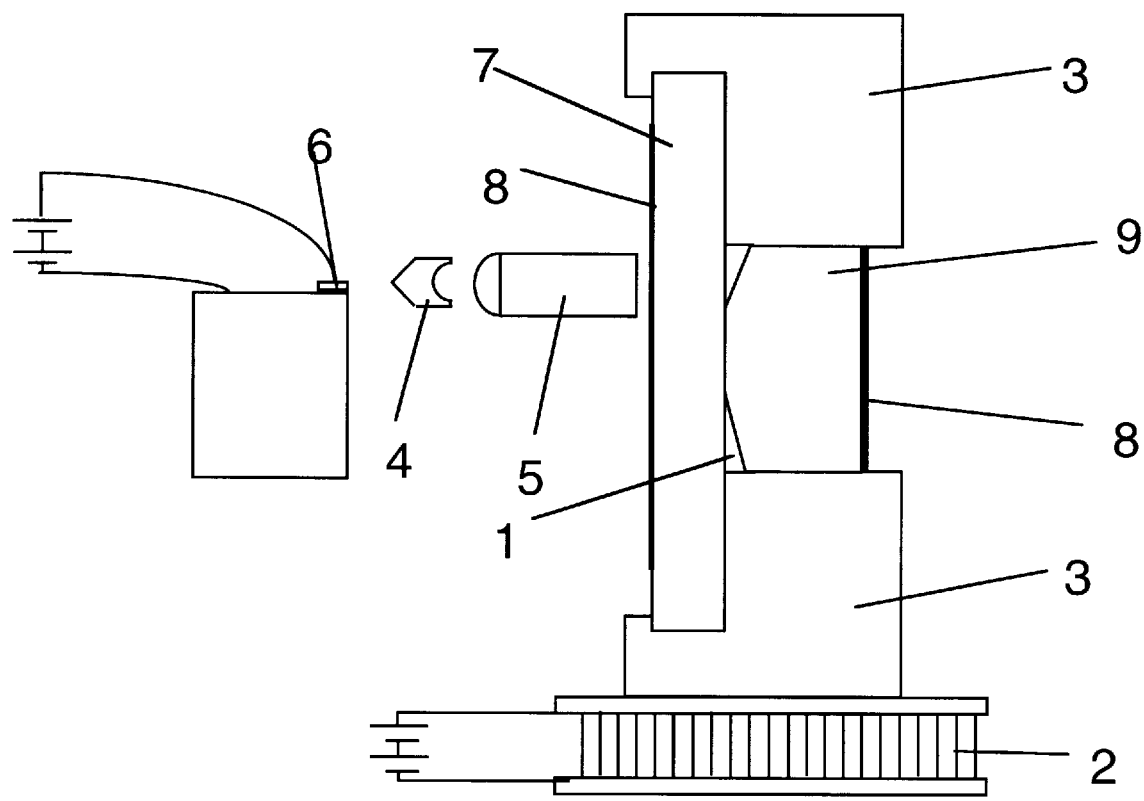
FIG. 6 is a Nd:$YVO_4$/$KNbO_3$ monolithic microchip green laser.

In the sixth embodiment, shown in FIG. 6, there are two crystals which make up the laser media. The first crystal 7 is $Nd:YVO_4$ and the second crystal 9 is $KNbO_3$. Upon pumping by the semiconductor laser 6 the first crystal 7 lases at a controlled wavelength of at least 1062 nm and at most 1066 nm, and the second crystal 9 frequency doubles at a controlled output wavelength of at least 531 nm and at most 533 nm.

Figure 7:
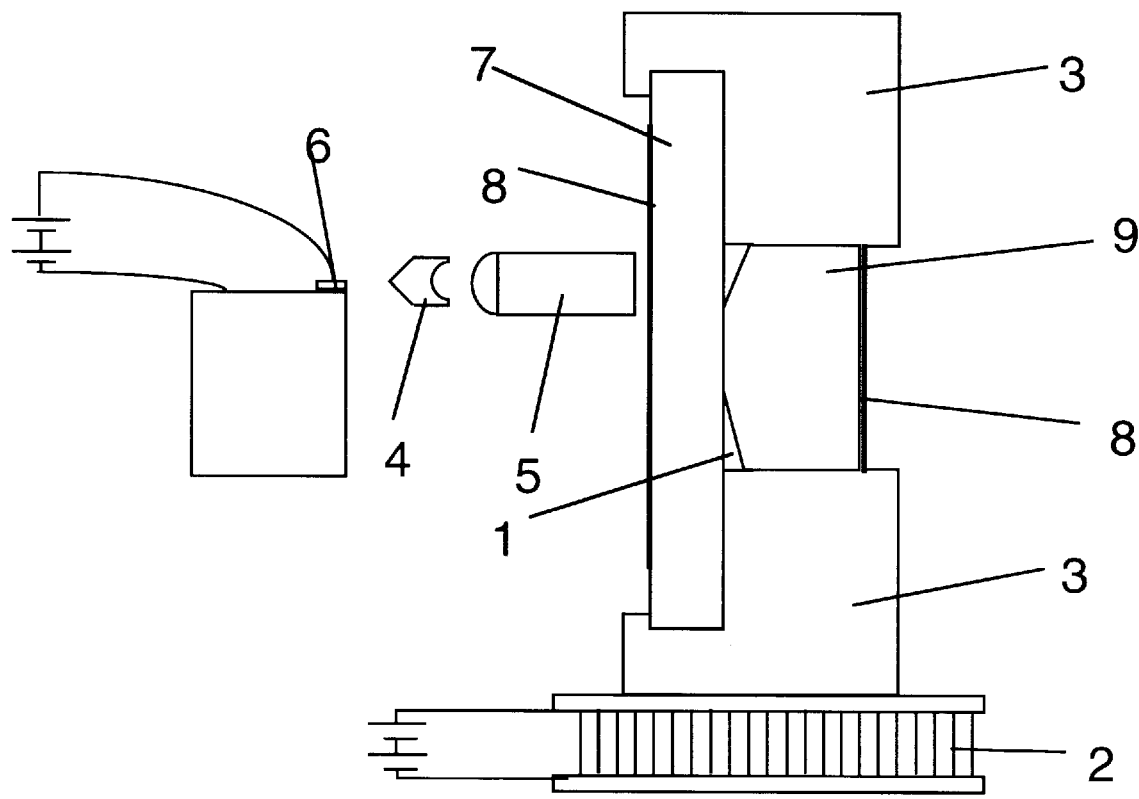
FIG. 7 is a Nd:YAG/$KNbO_3$ monolithic microchip blue laser.

In the seventh embodiment, shown in FIG. 7, there are two crystals which make up the laser media. The first crystal 7 is Nd:YAG and the second crystal 9 is $KNbO_3$. Upon pumping by the semiconductor laser 6 the first crystal 7 lases at a wavelength of at least 944 nm and at most 948 nm, and the second crystal frequency doubles at a controlled output wavelength of at least 472 nm and at most 474 nm. The power of the pumping laser 6 is at least 1 Watt and the power emitted by the second crystal 9 is at least 50 m Watts.

The monolithic structure specially bonded microchip laser, wedge shaped gap in the optical contact, mirror, focusing and collimating lens configuration are all novel futures of the present invention, however, the instant invention is also the combination of these features and the relative orientation of each of these components in a single unit construction of the continuously tunable laser. It is this combination which provides a highly efficient, low cost, low noise micro laser which is continuously tunable over a wide band of output wavelengths. Accordingly for all these reasons set fourth, it is seen that the micro laser of the present invention represents a significant advancement in the art of microchip lasers and has substantial commercial merit.

While there is shown and described herein certain specific structures embodying the invention, it will be manifest to those skilled in the art that modifications may be made without departing from the spirit and the scope of the underlying inventive concept. The present invention shall not be limited to the particular forms herein shown and described except by the scope of the appended claims.

What is claimed is:

1. A blue microchip continuously tunable laser comprising;

two different laser media, said laser media being a first crystal and a second crystal which are bonded to each other by an optical contact which includes a gap of at least 0.5 micron and at most 3 microns in thickness, said first crystal lasing at a continuously tunable wavelength of at least 860 nm and at most 960 nm, said second crystal frequency doubling at a continuously tunable output wavelength of at least 430 nm and at most 480 nm, said first crystal being pumped by a semiconductor pumping laser at a power of at least 30 m Watts and said second crystal emitting at least 10 micro Watts output power at a noise level of at most 0.5%.

2. The tunable laser of claim 1 wherein there is an aspherical microlens and a gradient index lens positioned between said semiconductor pumping laser and said laser media for collimating and focusing the pumping laser light, said first crystal being Cr:LiSAF and said second crystal being $KNbO_3$, said first crystal and said second crystal have substantially the same index of refraction, and said noise level is at most 0.1%.

3. The tunable laser of claim 1 wherein the output wavelength of said third crystal is continuously tunable by continuously changing the index of refraction of said second and said third crystals.

4. The tunable laser of claim 1 wherein the index of refraction of said laser media is continuously changed by the application of a change in thermal energy to said laser media by a thermo-electric heat exchanger which is in thermal contact with said laser media.

5. A blue microchip laser comprising;
three different laser media, said laser media being a first crystal, a second crystal, and a third crystal, said second crystal being bonded to said first crystal by an optical contact which includes a wedge shaped gap of at least 0.5 micron and at most 3 microns in thickness, said third crystal being bonded to said second crystal by said optical contact, said third crystal lasing at output wavelength of at least 354 nm and at most 356 nm, said first crystal being pumped by a semiconductor pumping laser at a power of at least 1 Watt, said third crystal emitting at least 10 m Watts of power with a noise level of at most 0.5%.

6. The laser of claim 5 wherein there is an aspherical microlens and a gradient index lens positioned between said semiconductor pumping laser and said laser media for collimating and focusing the pumping laser light, said first crystal being Nd:YAG, said second crystal being $KNbO_3$, and said third crystal being LBO, said three different laser media have substantially the same index of refraction, and said noise level is at most 0.1%.

7. The laser of claim 5 wherein the index of refraction of said laser media and the output wavelength from said third crystal is controlled by the application of a change in thermal energy to said laser media by a thermo-electric heat exchanger which is in thermal contact with said laser media.

8. A blue microchip laser comprising: two different laser media, said laser media being a first crystal and a second crystal, said second crystal being bonded to said first crystal by an optical contact which includes a wedge shaped gap of at least 0.5 micron and at most 3 microns, said first crystal lasing at a wavelength of at least 912 nm and at most 918 nm, and said second crystal lasing at a wavelength of at least 456 nm and at most 459 nm, said first crystal being pumped by a semiconductor pumping laser at a power of at least 1 Watt and said second crystal emitting at least 50 m Watts of power with a noise level of at most 0.5%.

9. The laser of claim 8 wherein there is an aspherical microlens and a gradient index lens positioned between said semiconductor pumping laser and said laser media for collimating and focusing collimating the pumping laser light, said first crystal being $Nd:YVO_4$, and said second crystal being $KNbO_3$, said first crystal and said second crystal have substantially the same index of refraction, and said noise level is at most 0.1%.

10. The laser of claim 8 wherein the index of refraction and output wavelength of said second crystal is controlled by the application of a change in thermal energy in the said laser media by a thermo-electric heat exchanger which is in thermal contact with said laser media.

11. A monolithic microchip laser comprising at least two different laser media being bonded to each other by an optical contact, said contact including a wedge shaped gap of at least 0.5 micron and at most 3 microns in thickness, said laser media being pumped by a semiconductor laser with a power of at least 1 Watt to induce lasing in said laser media with a noise level of at most 0.5%.

12. The laser of claim 11 wherein the said laser media are three different crystals, a first crystal, a second crystal and a third crystal, and there is an aspherical microlens and a gradient index lens positioned between said semiconductor pumping laser and said laser media for collimating and focusing the pumping laser light, said first crystal being Nd:YAG, said second crystal being KTP, and said third crystal being $KNbO_3$, said three different laser media having substantially the same index of refraction, said third crystal lasing at a continuously tunable output wavelength of at least 2000 nm and at most 4500 nm, said noise level is at most 0.1%.

13. The laser of claim 12 wherein the output wavelength of said third crystal is continuously tunable by continuously changing the index of refraction of said second and said third crystals by the application of a change in thermal energy to said laser media by a thermo-electric heat exchanger which is in thermal contact with said laser media.

14. The laser of claim 11 wherein the laser media are three different crystals, a first crystal being Nd:YAG, a second crystal being $Cr:Mg_2SiO_4$, and a third crystal being $KNbO_3$, and there is an aspherical microlens and a gradient index lens disposed between said pumping laser and said laser media for focusing and collimating the laser light, said three different laser media have substantially the same index of refraction, said third crystal lases at a continuously tunable output wavelength of at least 565 nm and at most 684 nm, and said noise level is at most 0.1%.

15. The laser of claim 14 wherein the output wavelength of said third crystal is continuously tunable by continuously changing the index of refraction of said second and said third crystals by the application of a change in thermal energy to said laser media by a thermo-electric heat exchanger which is in thermal contact with said laser media.

16. The laser of claim 11 wherein the laser media are two different crystals, a first crystal being $Nd:YVO_4$, and a second crystal being $KNbO_3$, and there is an aspherical microlens and a gradient index lens disposed between said pumping laser and said laser media for focusing and collimating the laser light, said two different laser media have substantially the same index of refraction, said first crystal lases at a wavelength of at least 1062 nm and at most 1066 nm, said second crystal lases at a controlled wavelength of at least 531 nm and at most 533 nm, and said noise level is at most 0.1%.

17. The laser of claim 16 wherein the output wavelength of said second crystal is controlled by changing the index of refraction of said second crystal by the application of a change in thermal energy to said laser media by a thermo-electric heat exchanger which is in thermal contact with said laser media.

18. A blue microchip laser comprising: two different laser media, said laser media being a first crystal and a second crystal, said second crystal being bonded to said first crystal by an optical contact which includes a gap of at least 0.5 micron and at most 3 microns, said first crystal lasing at a wavelength of at least 944 nm and at most 948 nm, said second crystal lasing at a wavelength of at least 472 nm and at most 474 nm, said first crystal being pumped by a semiconductor pumping laser with at least 1 Watt of power, said second crystal emitting at least 50 m Watts of power with a noise level of at most 0.5%.

19. The laser of claim 18 wherein there is an aspherical microlens and a gradient index lens disposed between said semiconductor pumping laser and said laser media for focusing and collimating the pumping laser light, said first crystal being Nd:YAG, and said second crystal being $KNbO_3$, said second and said first crystals having substantially the same index of refraction, said noise level is at most 0.1%.

20. The laser of claim 19 wherein the index of refraction and output wavelength of said second crystal is controlled by the application of a change in thermal energy to said laser media by a thermo-electric heat exchanger which is in thermal contact with said laser media.

* * * * *